United States Patent
Takeda et al.

(10) Patent No.: US 9,046,947 B2
(45) Date of Patent: Jun. 2, 2015

(54) TOUCH PANEL APPARATUS WITH PIEZOELECTRIC ELEMENT

(75) Inventors: Jun Takeda, Kanagawa (JP); Kenji Kono, Kanagawa (JP); Tomotake Aono, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 86 days.

(21) Appl. No.: 13/880,644

(22) PCT Filed: Oct. 19, 2011

(86) PCT No.: PCT/JP2011/005852
§ 371 (c)(1),
(2), (4) Date: Apr. 19, 2013

(87) PCT Pub. No.: WO2012/053202
PCT Pub. Date: Apr. 26, 2012

(65) Prior Publication Data
US 2013/0215080 A1      Aug. 22, 2013

(30) Foreign Application Priority Data

Oct. 21, 2010   (JP) .................................. 2010-236775

(51) Int. Cl.
*G06F 3/041*    (2006.01)
*G06F 3/01*     (2006.01)

(52) U.S. Cl.
CPC ................ *G06F 3/041* (2013.01); *G06F 3/016* (2013.01)

(58) Field of Classification Search
CPC ..................................................... G06F 3/041
USPC ......... 345/173, 174; 178/18.01–18.06, 19.01; 340/407.2
See application file for complete search history.

(56) References Cited

U.S. PATENT DOCUMENTS

| | | | |
|---|---|---|---|
| 5,541,372 A * | 7/1996 | Baller et al. ................ | 178/18.01 |
| 2006/0050059 A1* | 3/2006 | Satoh et al. .................... | 345/173 |
| 2006/0181522 A1* | 8/2006 | Nishimura et al. ........... | 345/177 |

(Continued)

FOREIGN PATENT DOCUMENTS

| | | |
|---|---|---|
| CN | 1815427 A | 8/2006 |
| CN | 1821935 A | 8/2006 |

(Continued)

OTHER PUBLICATIONS

An Office Action issued by the Taiwanese Patent Office on Mar. 5, 2014, which corresponds to Taiwanese Patent Application No. 100138261 and is related to U.S. Appl. No. 13/880,644; with English language concise explanation.

(Continued)

*Primary Examiner* — Pegeman Karimi
(74) *Attorney, Agent, or Firm* — Studebaker & Brackett PC (57) ABSTRACT

A touch panel apparatus includes a touch panel (11), a piezoelectric element (12) disposed on the touch panel (11) and capable of expansion and contraction, and a plurality of support members (14a-14f) disposed on a fixing portion (13) and configured to support and allow for flexure vibration of the touch panel (11), such that the support members (14a-14f) are disposed in greater number in a direction orthogonal to an expansion and contraction direction of the piezoelectric element (12) than in the expansion and contraction direction so that a bending direction of the touch panel (11) due to a press matches a flexure direction of the touch panel (11) due to the expansion and contraction of the piezoelectric element (12).

5 Claims, 8 Drawing Sheets

(56) References Cited

U.S. PATENT DOCUMENTS

| | | | |
|---|---|---|---|
| 2006/0192657 A1 | 8/2006 | Nishimura et al. | |
| 2007/0080951 A1 | 4/2007 | Maruyama et al. | |
| 2010/0156844 A1* | 6/2010 | Paleczny et al. | 345/174 |
| 2010/0253485 A1* | 10/2010 | Park et al. | 340/407.2 |
| 2012/0162143 A1 | 6/2012 | Kai et al. | |

FOREIGN PATENT DOCUMENTS

| | | |
|---|---|---|
| JP | 2004-192412 A | 7/2004 |
| JP | 2006-215776 A | 8/2006 |
| JP | 2006-227712 A | 8/2006 |
| TW | 201112087 A | 4/2011 |

OTHER PUBLICATIONS

International Search Report; PCT/JP2011/005852; Jan. 24, 2012.

The first Office Action issued by the Chinese Patent Office on Apr. 13, 2015, which corresponds to Chinese Patent Application No. 201180050904.X and is related to U.S. Appl. No. 13/880,644; with English language concise explanation.

* cited by examiner

TOUCH PANEL APPARATUS WITH PIEZOELECTRIC ELEMENT

CROSS-REFERENCE TO RELATED APPLICATION

This application claims priority to and the benefit of Japanese Patent Application No. 2010-236775 filed Oct. 21, 2010, the entire contents of which are incorporated herein by reference.

TECHNICAL FIELD

The present invention relates to a touch panel apparatus.

BACKGROUND ART

Figure 8:
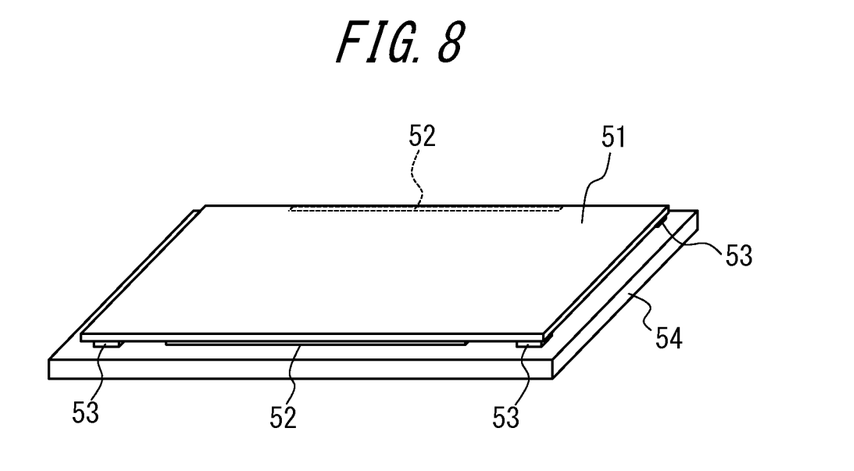
FIG. 8 is a perspective view schematically illustrating the structure of a conventional touch panel apparatus.

In recent years, a variety of input apparatuses have been proposed in which piezoelectric elements are provided in a touch panel. When a user's finger, a stylus pen, or the like presses a target in a predetermined area of the touch panel, the input apparatuses detect input of the press and drive the piezoelectric elements, thus vibrating the touch panel so as to provide the user with an appropriate operational feeling. In a known touch panel apparatus, for example as illustrated in FIG. 8, at the back of each of the long sides of an oblong touch panel 51, a piezoelectric element 52 capable of expansion and contraction is disposed in the long side direction. The touch panel 51 is provided four-point support at the four corners by a fixing frame 54, with fixing cushions 53 therebetween, so as to be capable of flexure vibration (for example, see Patent Literature 1).

Figure 9:
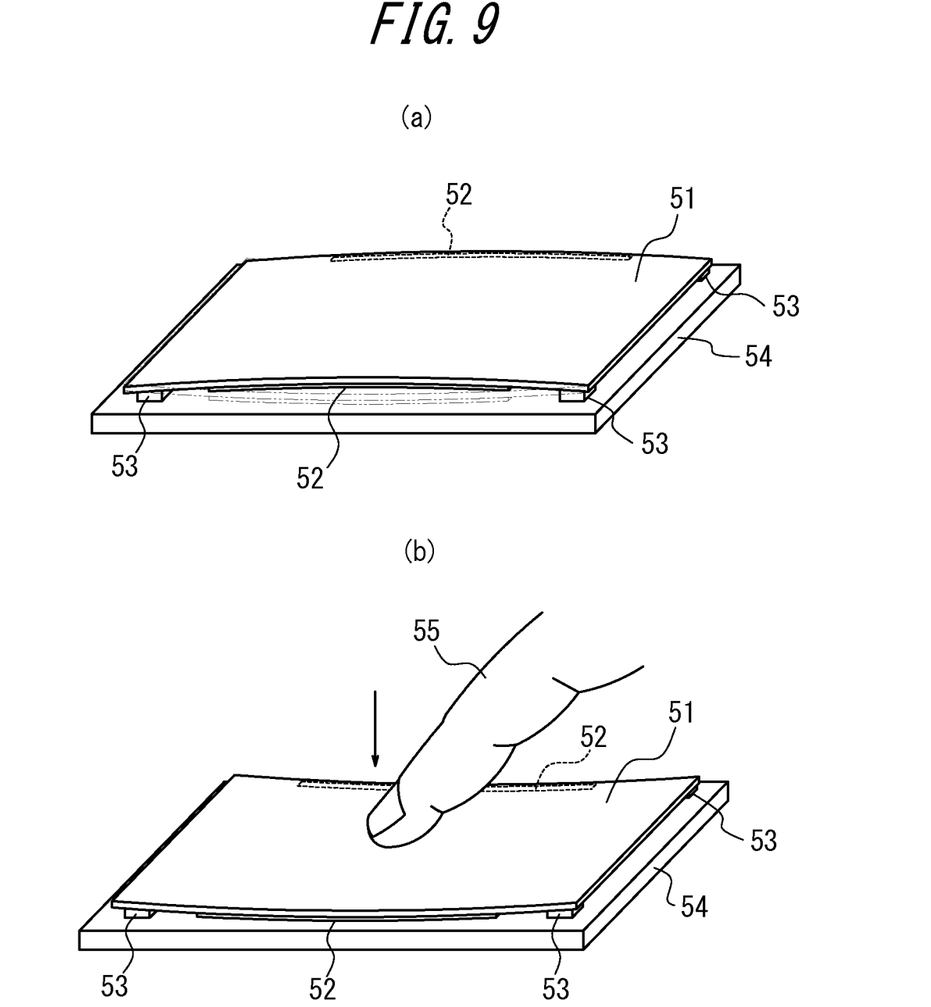
FIG. 9 is a schematic perspective view of the touch panel illustrated in FIG. 8 in a vibrating state and a pressed state.

With the touch panel apparatus illustrated in FIG. 8, when the piezoelectric elements 52 on the long sides are driven to expand and contract in the long side direction at the same phase, the fixing cushions 53 elastically deform, and the touch panel 51 undergoes flexure vibration with the short sides as pivots as illustrated by the schematic perspective view in FIG. 9(a). Note that such flexure vibration is also referred to as bending vibration. As illustrated in FIG. 9(b), when the touch panel 51 is pressed by a finger 55, for example, the long sides of the touch panel 51 bend more than the short sides, i.e. the touch panel 51 flexes.

In such a touch panel apparatus as illustrated in FIG. 8, the flexure vibration direction of the touch panel 51 due to the piezoelectric elements 52 matches the bending direction of the touch panel 51 due to the press by the finger 55. Accordingly, when the touch panel 51 is being pressed, as illustrated in FIG. 9(b), the touch panel 51 may be caused by the piezoelectric elements 52 to undergo flexure vibration more efficiently. Furthermore, since the touch panel 51 bends due to elastic deformation of the fixing cushions 53, the same amount of expansion and contraction yields a larger vibration amplitude than when the piezoelectric elements 52 are provided on the short sides of the touch panel 51, thus offering the advantages of a reduction in size of the piezoelectric elements 52 and reduced costs.

CITATION LIST

Patent Literature

PTL 1: JP2006227712A

SUMMARY OF INVENTION

In a touch panel apparatus that vibrates a touch panel, however, the locations on the touch panel at which piezoelectric elements are placed may be restricted. For example, in the case of a touch panel apparatus constituting a mobile terminal in which an oblong touch panel, as illustrated in FIG. 8, has vertically long sides, the width of the housing that stores the touch panel typically allows little room for an effective operating area of the touch panel as compared to the length (height) of the housing. This design is adopted out of consideration for size reduction and appearance.

Therefore, in order to provide piezoelectric elements on the long sides of the touch panel, it is necessary to take measures so that the piezoelectric elements are not visible, either by increasing the width of the housing or decreasing the width of the effective operating area of the touch panel by an amount corresponding to the width of the piezoelectric elements. However, adopting such a structure can be assumed to increase the size of the touch panel apparatus or to detract from the appearance.

One way of addressing this problem is, for example, to provide piezoelectric elements along the short sides of the touch panel which are located in the height direction of the housing, which comparatively has more room. For example, in the touch panel apparatus illustrated in FIG. 8, the piezoelectric elements 52 could be provided along the short sides of the oblong touch panel 51, as illustrated in the plan view of FIG. 10.

Figure 10:
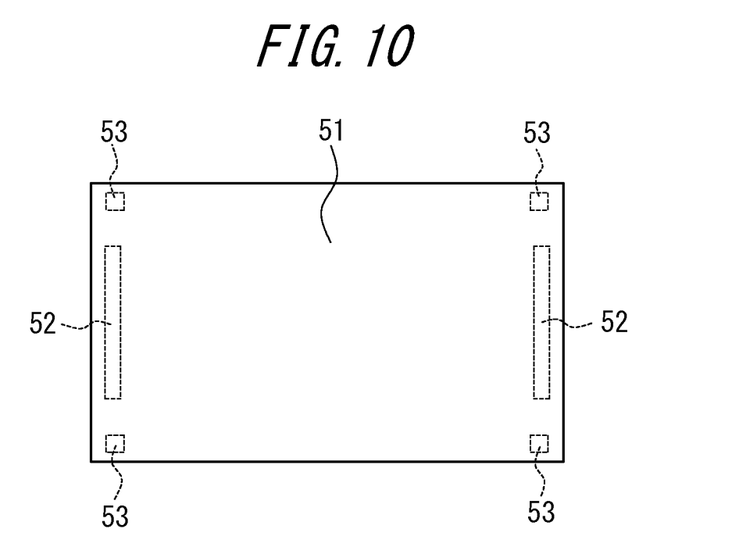
FIG. 10 is a plan view illustrating an example of an assumed conventional layout of piezoelectric elements on an oblong touch panel.
Figure 11:
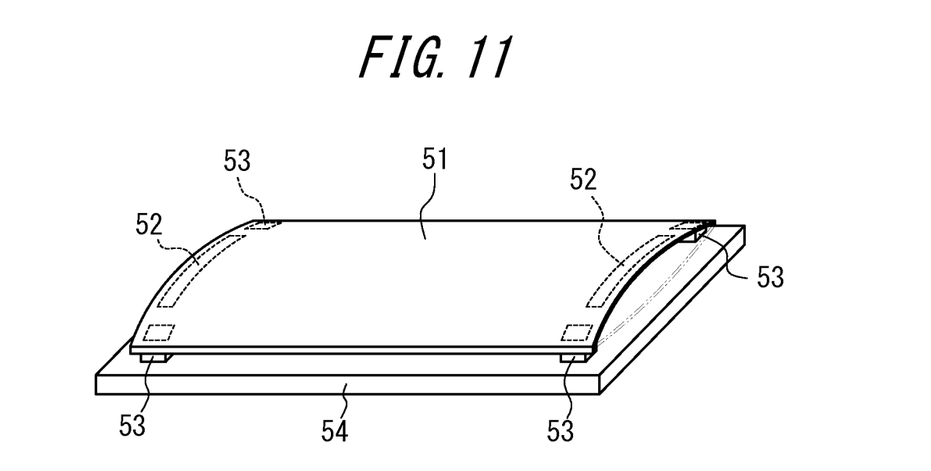
FIG. 11 is a schematic perspective view of the touch panel illustrated in FIG. 10 in a vibrating state.

Nevertheless, if piezoelectric elements 52 are simply disposed along the short sides of the touch panel 51 and four-point support is provided, as illustrated in FIG. 10, then due to expansion and contraction of the piezoelectric elements 52, the touch panel 51 will undergo flexure vibration with the long sides as pivots as illustrated by the schematic perspective view in FIG. 11. As a result, the flexure vibration direction due to the piezoelectric elements 52 and the bending direction due to the press illustrated in FIG. 9(b) differ, thereby causing an increase in energy loss during flexure vibration of the touch panel 51 due to the piezoelectric elements 52 and leading to the risk of not attaining the desired vibration amplitude.

The present invention has been conceived in light of the above problems, so as to provide a touch panel apparatus that allows a touch panel to undergo flexure vibration efficiently at a desired amplitude without an increase in size of the apparatus and without detracting from the appearance.

A touch panel apparatus according to a first aspect of the present invention for achieving the above object comprises: a touch panel; a piezoelectric element disposed on the touch panel and capable of expansion and contraction; and a plurality of support members disposed on a fixing portion and configured to support and allow for flexure vibration of the touch panel, wherein the support members are disposed in greater number in a direction intersecting an expansion and contraction direction of the piezoelectric element than in the expansion and contraction direction so that a bending direction of the touch panel due to a press matches a flexure direction of the touch panel due to the expansion and contraction of the piezoelectric element.

A second aspect of the present invention is the touch panel apparatus according to the first aspect, wherein the support members are disposed so that a distance between the support members adjacent in the direction intersecting the expansion and contraction direction of the piezoelectric element is shorter than a distance between the support members in the expansion and contraction direction of the piezoelectric element.

A third aspect of the present invention is the touch panel apparatus according to the first aspect, wherein among at least the support members disposed in the direction intersecting the expansion and contraction direction, each support member disposed between outermost support members has a larger elastic coefficient than the outermost support members.

A touch panel apparatus according to a fourth aspect of the present invention for achieving the above object comprises: an oblong touch panel; a piezoelectric element disposed along a short side of the touch panel and capable of expansion and contraction in a short side direction; and a plurality of support members disposed on a fixing portion and configured to support and allow for flexure vibration of the touch panel, wherein the support members are disposed at four corner portions of the touch panel and between the corner portions on long sides of the touch panel so that a bending direction of the touch panel due to a press matches a flexure direction of the touch panel due to the expansion and contraction of the piezoelectric element.

A fifth aspect of the present invention is the touch panel apparatus according to the fourth aspect, wherein the support members are disposed so that a distance between the support members adjacent in a direction parallel to the long sides of the touch panel is shorter than a distance between the support members in a direction parallel to short sides of the touch panel.

A sixth aspect of the present invention is the touch panel apparatus according to the fourth aspect, wherein among at least the support members disposed in the direction parallel to the long sides of the touch panel, each support member not disposed at the corner portions has a larger elastic coefficient than the support members disposed at the corner portions.

A seventh aspect of the present invention is the touch panel apparatus according to the fourth aspect, wherein the touch panel includes a rectangular effective operating area having two sides parallel to the long sides of the touch panel and two sides parallel to the short sides of the touch panel; and the four corner portions are regions bordered by the long sides and the short sides of the touch panel and by extensions of the sides of the effective operating area.

According to the embodiments herein, a touch panel apparatus that may cause a touch panel to undergo flexure vibration efficiently at a desired amplitude without an increase in size of the apparatus and without detracting from the appearance is provided.

BRIEF DESCRIPTION OF DRAWINGS

Embodiments will be further described below with reference to the accompanying drawings, wherein.

DESCRIPTION OF EMBODIMENTS

An embodiment of the present invention will be described with reference to the accompanying drawings.

Figure 1:
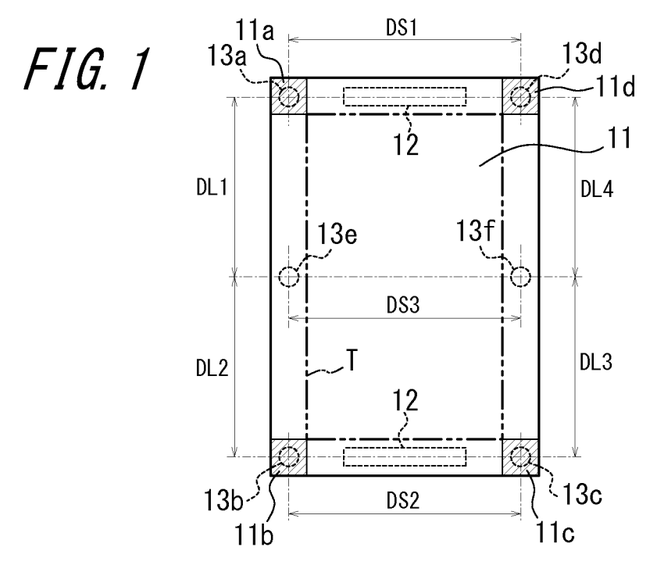
FIG. 1 is a plan view schematically illustrating the structure of a touch panel apparatus according to an embodiment of the present invention.
Figure 2:
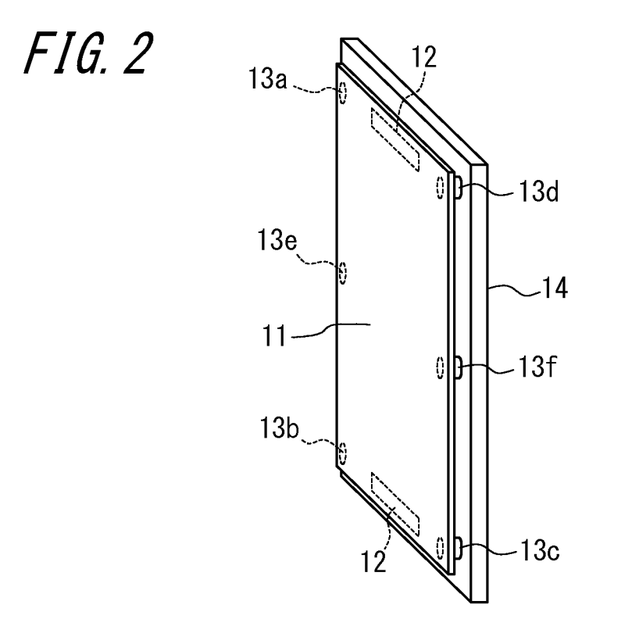
FIG. 2 is a perspective view of the touch panel apparatus illustrated in FIG. 1.

FIGS. 1 and 2 are a plan view and a perspective view schematically illustrating the structure of a touch panel apparatus according to an embodiment of the present invention. The touch panel apparatus according to the present embodiment includes an oblong touch panel 11. While the example of the oblong touch panel 11 in FIG. 1 is rectangular, an oblong shape in this description is not limited to being rectangular, but also includes a shape with rounded corners.

At the back, near the short ends of the touch panel 11, a piezoelectric element 12 is provided along each short end. Each of the piezoelectric elements 12 is formed from monomorph, bimorph, unimorph, or the like, and one side is adhesively secured to the touch panel 11 so as to be able to expand and contract in the short side direction of the touch panel 11.

So that the bending direction due to a target being pressed by the operator's finger, a stylus pen or the like matches the flexure direction due to expansion and contraction of the piezoelectric elements 12, the touch panel 11 is supported, on the reverse side, by a fixing portion 14 with elastically deformable support members 13a-13f therebetween at six locations: four corner portions 11a-11d, and a location between each pair of corner portions 11a/11b and 11c/11d on the long sides. In other words, the touch panel 11 undergoes six-point support by the six support members 13a-13f, which are disposed in greater number in a direction orthogonally intersecting the expansion and contraction direction of the piezoelectric elements 12, i.e. the long side direction of the touch panel 11, than in the expansion and contraction direction of the piezoelectric elements 12, i.e. the short side direction of the touch panel 11. In the example described, the support members 13a-13f are cylindrical, but any other shape may be adopted, such as a prism. Note that the fixing portion 14 is, for example, a liquid crystal or organic EL display panel.

Assuming the touch panel 11 includes a rectangular effective operating area T having two sides parallel to the long sides of the touch panel 11 and two sides parallel to the short sides of the touch panel 11, as illustrated by the phantom lines in FIG. 1, then the piezoelectric elements 12 are preferably disposed in regions outside of the effective operating area T. The four corner portions 11a-11d of the touch panel 11 are preferably regions (indicated by hatching) bordered by the long sides and the short sides of the touch panel 11 and by extensions of the sides of the effective operating area T. The support members 13a-13d supporting the corner portions 11a-11d are respectively provided in the regions of the corner portions 11a-11d, preferably at a location within the regions of the corner portions 11a-11d separate from the corresponding corner edge of the effective operating area T. Furthermore, the support members 13a-13d supporting the corner portions 11a-11d are respectively provided in the regions of the corner portions 11a-11d so as to contact with one of the long sides of the touch panel 11, and preferably in the regions of the corner portions 11a-11d so as to contact with one of the long sides and with one of the short sides of the touch panel 11. Assuming the support members 13a-13d are disposed as described above, the support member 13e disposed between the support members 13a and 13b is preferably disposed along a straight line connecting the support members 13a and 13b. Furthermore, the support member 13f disposed between the support members 13c and 13d is preferably disposed along a straight line connecting the support members 13c and 13d. Note that FIG. 1 illustrates an example in which the effective operating area T is oblong like the touch panel 11, but the effective operating area T may be square.

Distances DL1 and DL2 between the support member 13e supporting the middle of one of the long sides of the touch panel 11 and the support members 13a and 13b at the corner portions 11a and 11b adjacent to the support member 13e on the same long side are shorter than distances DS1 and DS2 between pairs of adjacent support members 13a, 13d and 13b, 13c respectively supporting pairs of corner portions 11a, 11d and 11b, 11c in the short side direction of the touch panel 11. Similarly, distances DL3 and DL4 between the support member 13f supporting the middle of the other one of the long sides of the touch panel 11 and the support members 13c and 13d at the corner portions 11c and 11d adjacent to the support member 13f on the same long side are shorter than the distances DS1 and DS2. A distance DS3 between the support members 13e and 13f is longer than each of the distances DL1-DL4.

The touch panel 11 is thus supported by sets of four support members 13a, 13e, 13f, 13d and 13e, 13f, 13b, 13c, the support members being adjacent in the expansion and contraction direction of the piezoelectric elements 12 and the direction orthogonal to the expansion and contraction direction and forming oblong shapes with long sides along the expansion and contraction direction of the piezoelectric elements 12. The support members 13e and 13f supporting the middle of the long sides of the touch panel 11 are preferably disposed at the center of the corresponding long side, so that $DL1 \approx DL2 \approx DL3 \approx DL4 < DS1 \approx DS2 \approx DS3$.

Figure 3:
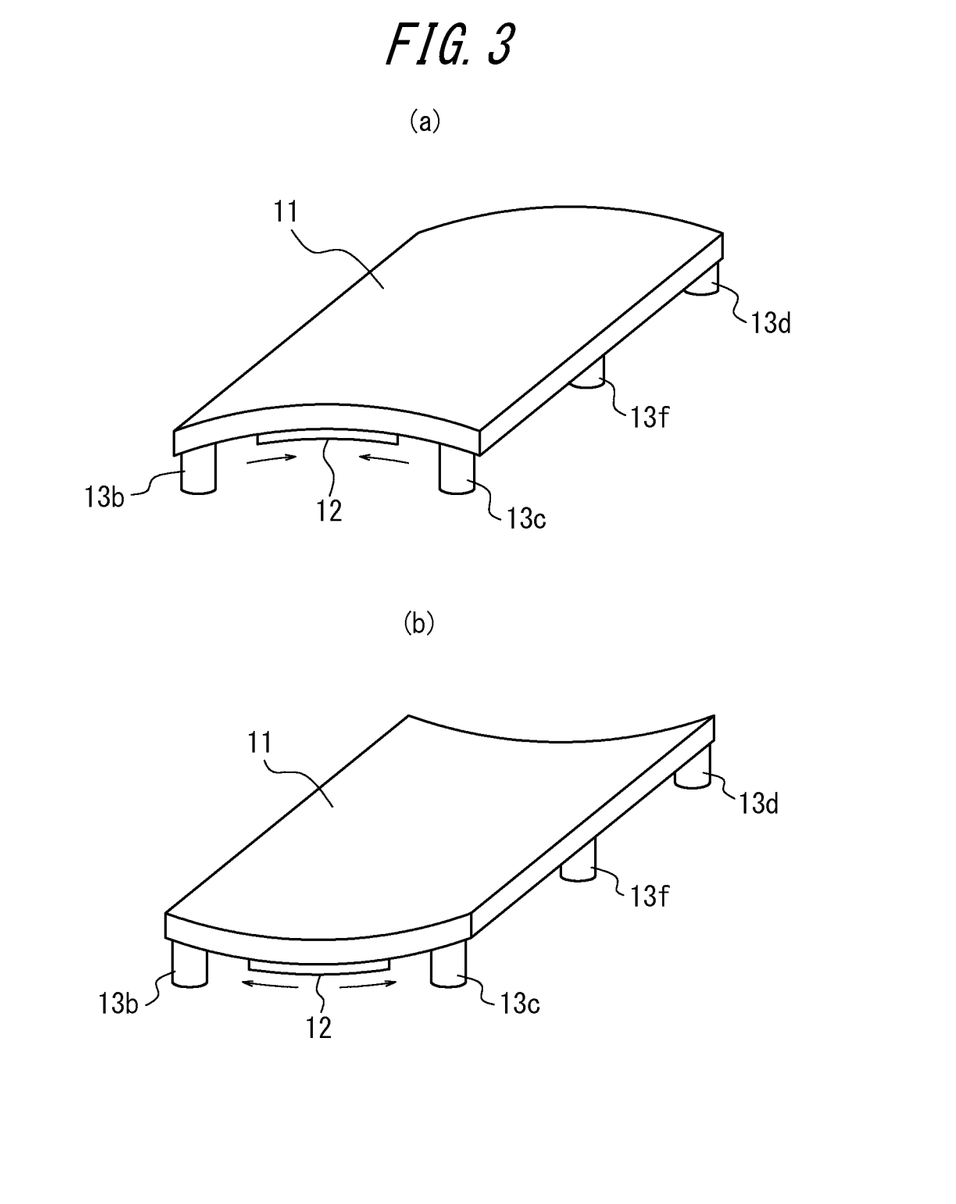
FIG. 3 is a schematic perspective view of the touch panel illustrated in FIG. 1 in a vibrating state.
Figure 4:
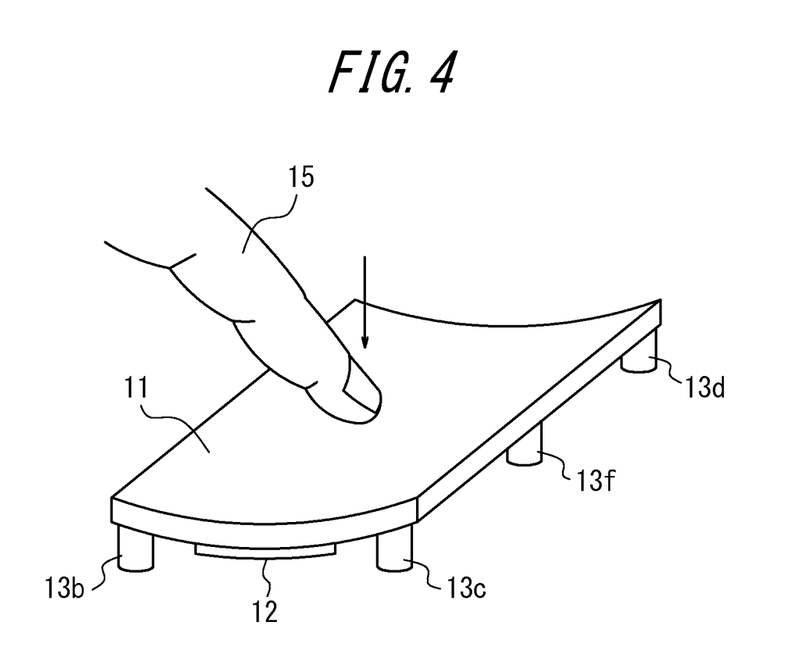
FIG. 4 is a schematic perspective view of the touch panel illustrated in FIG. 1 in a pressed state.

In the touch panel apparatus according to the present embodiment, when the two piezoelectric elements 12 disposed on the short sides of the touch panel 11 are driven to expand and contract in the short side direction of the touch panel 11 at the same phase, the touch panel 11 undergoes flexure vibration with the long sides as pivots as illustrated by the schematic perspective views in FIG. 3(a) and FIG. 3(b). Furthermore, when the touch panel 11 is pressed by a finger 15, for example, the short sides bend more than the long sides, as illustrated by the schematic perspective view in FIG. 4. Accordingly, the bending direction due to a target being pressed matches the flexure direction due to the expansion and contraction of the piezoelectric elements 12. Therefore, as compared to when piezoelectric elements are disposed on the short sides of an oblong touch panel that has only four-point support as illustrated in FIG. 10, the energy loss during flexure vibration is reduced when the touch panel 11 illustrated in FIG. 4 is in a pressed state, and the touch panel 11 may be caused by the piezoelectric elements 12 to undergo flexure vibration at a desired amplitude more efficiently.

If the support members 13e and 13f supporting the middle of the long sides of the touch panel 11 are disposed so as to divide the corresponding long side approximately in half, the entire touch panel 11 in the long side direction thereof may be caused by the piezoelectric elements 12 to undergo flexure vibration that is nearly uniform in the short side direction. As a result, it is possible to provide the operator with a nearly identical tactile sensation throughout the effective operating area T of the touch panel 11.

Furthermore, in the touch panel apparatus of the present embodiment, the piezoelectric elements 12 are disposed on the short sides of the oblong touch panel 11, and therefore in the case of a touch panel apparatus constituting a mobile terminal in which the touch panel 11 has vertically long sides, the piezoelectric elements 12 can be disposed in the height direction of the housing, which comparatively has more room. The touch panel apparatus of the present embodiment thus offers a greater degree of freedom in design, without an increase in size of the touch panel apparatus and without detracting from the appearance.

The following describes the results of an experiment performed by the inventors to compare vibration characteristics of four-point support and six-point support.

Figure 5:
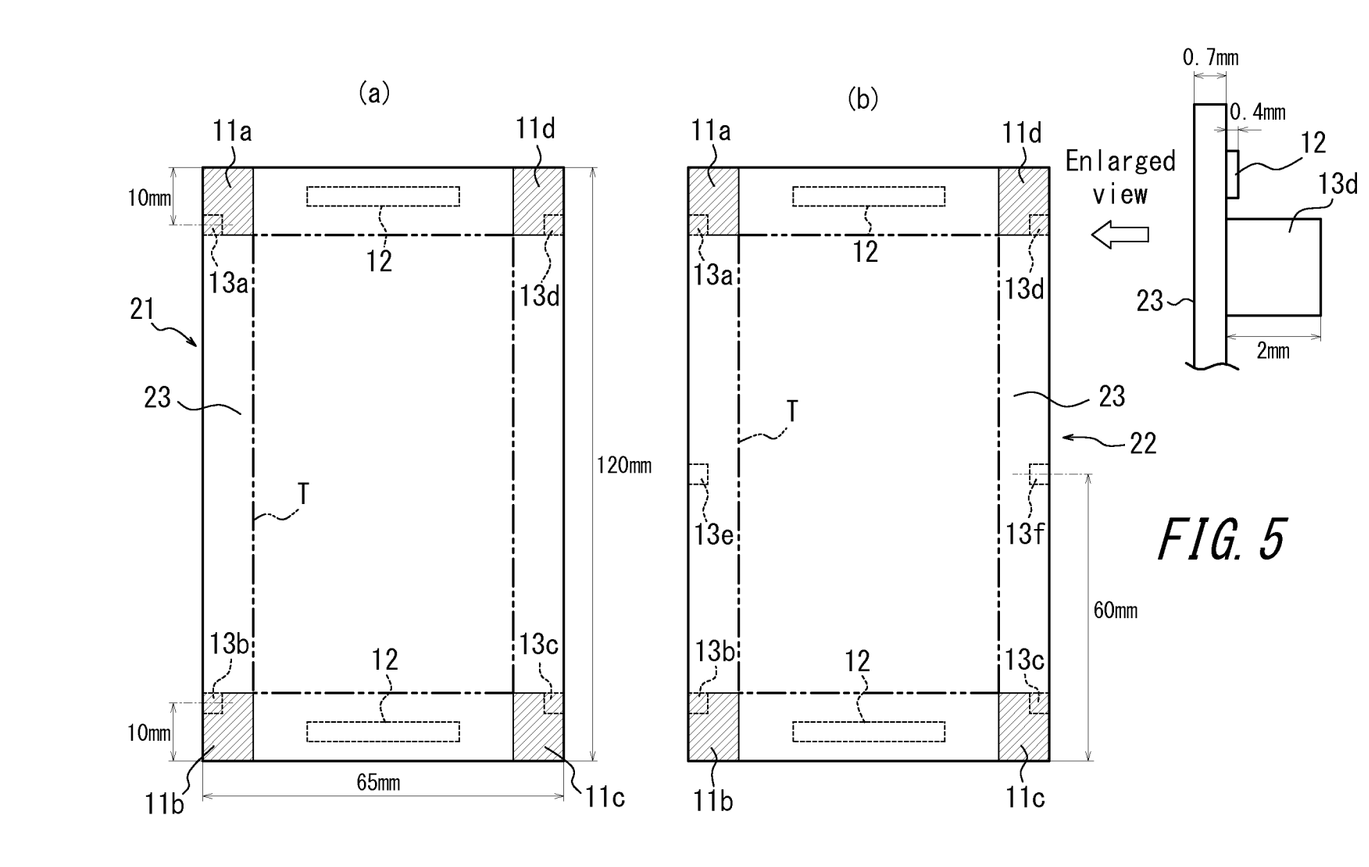
FIG. 5 is a plan view of samples used in an experiment to compare vibration characteristics of four-point support and six-point support.

FIG. 5(a) and FIG. 5(b) are plan views of samples used in the comparison experiment. Sample 21 illustrated in FIG. 5(a) and sample 22 illustrated in FIG. 5(b) each have piezoelectric elements 12 disposed along the short sides thereof at the back of an oblong hardened glass 23, at locations near the short sides and separate from an effective operating area T indicated by phantom lines. The sample 21 is provided with four-point support by support members 13a-13d that support four corner portions 11a-11d of the hardened glass 23. On the other hand, the sample 22 is provided with six-point support by support members 13a-13f that support the four corner portions 11a-11d and the central portion of each long side of the hardened glass 23.

The hardened glass 23 in FIG. 5(a) and FIG. 5(b) has short sides of 65 mm, long sides of 120 mm, and a thickness of 0.7 mm. Each piezoelectric element 12 has short sides of 2 mm, long sides of 40 mm, and a thickness of 0.4 mm.

The support members 13a-13f are formed from PORON (registered trademark) H-48 manufactured by Rogers Inoac Corporation and are prisms with length×width×height dimensions of 3 mm×3 mm×2 mm. The support members 13a-13d are respectively disposed in the region of the corresponding one of the corner portions 11a-11d, separated from the short side of the hardened glass 23 by 10 mm. The support members 13e and 13f are disposed at the center of the corresponding long side, at a location separated from each short side by 60 mm.

Here, in FIG. 5(a), one side of each of the support members 13a and 13b is aligned with one long side of the hardened glass 23, and one side of each of the support members 13c and 13d is aligned with the other long side of the hardened glass 23. As a result, the four support points form an oblong shape with the same orientation as the hardened glass 23.

In FIG. 5(b), one side of each of the support members 13a, 13b, and 13e on one long side of the hardened glass 23 is aligned with the long side, and similarly, one side of each of the support members 13c, 13d, and 13f on the other long side of the hardened glass 23 is aligned with the other long side. As a result, two sets of four neighboring support points form two oblong shapes aligned in the long side direction of the hardened glass 23 and oriented orthogonally to the hardened glass 23. In other words, the long sides of each oblong shape formed by four neighboring support points are formed in the short side direction of the hardened glass 23, and conversely the short sides are formed in the long side direction.

Figure 6:
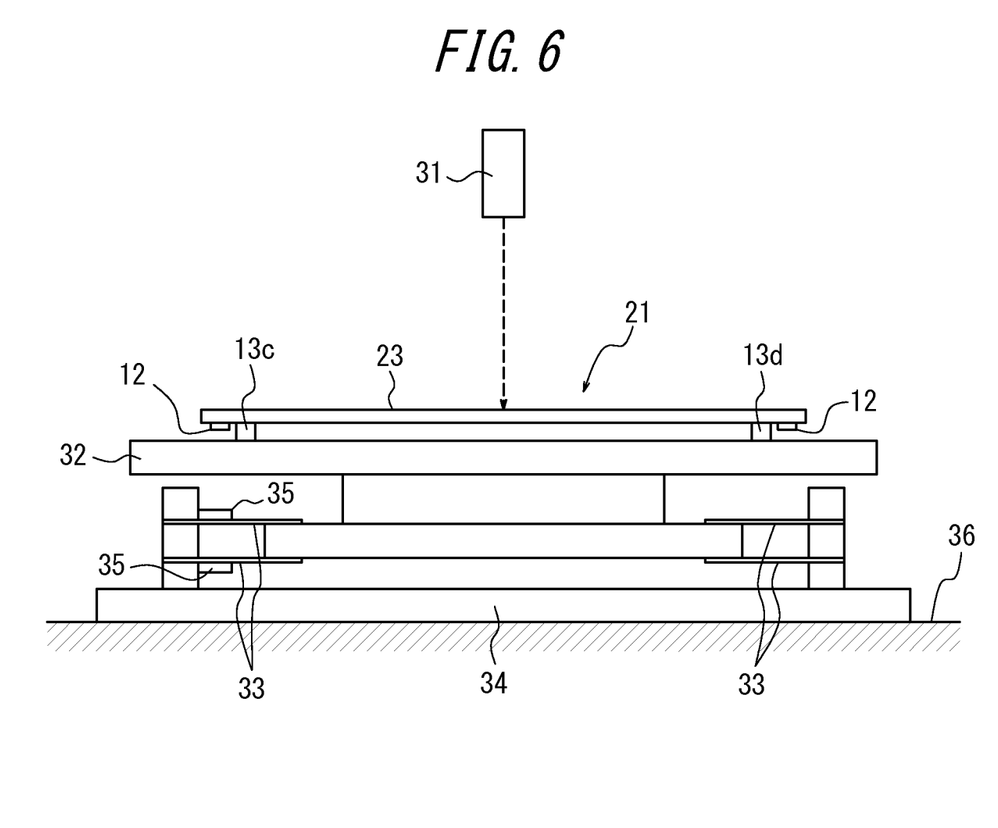
FIG. 6 is a schematic diagram illustrating the structure of an experiment apparatus in the experiment on vibration characteristics.

FIG. 6 is a schematic diagram illustrating the structure of an experiment apparatus. With a laser Doppler vibrometer 31, this experiment apparatus measures the vibration amplitude (μm) and the output frequency (Hz) at the central portion of the hardened glass 23 in the samples 21 and 22. Note that FIG. 6 illustrates an example in which the sample 21 is being measured. The experiment apparatus is provided with a mount 32 on which the sample 21 is mounted, a support base 34 supporting the mount 32 with at least two pairs of parallel plate springs 33 therebetween so that the mount 32 is displaceable in the direction perpendicular to the mount surface, and strain gauges 35 respectively attached to the parallel plate springs 33 in one of the pairs thereof.

In the comparison experiment, the support base 34 was placed on a surface plate 36, and the sample 21 or 22 was placed on the mount 32 with the support members 13a-13d or the support members 13a-13f facing downwards. The samples 21 and 22 were each pressed with a finger near the central portion of the hardened glass 23, and the press load was detected with the strain gauges 35. With a press load of 2 N detected, a drive signal was applied to the piezoelectric elements 12 to vibrate the hardened glass 23, and the vibration amplitude of the central portion of the hardened glass 23 as well as the output frequency were measured with the laser Doppler vibrometer 31. Note that the drive signal applied to the piezoelectric elements 12 was a half cycle of a sinusoidal input frequency that yielded an output frequency of 150 Hz to 350 Hz and provided the user pressing the touch panel with a pleasant sensation. The amplitude of the drive signal was 40 V.

The following table lists the results of the comparison experiment.

TABLE 1

| Input frequency Hz | Sample 22 (six-point support) | | Sample 21 (four-point support) | |
| --- | --- | --- | --- | --- |
| | Output frequency Hz | Output amplitude μm | Output frequency Hz | Output amplitude μm |
| 160 | 170.7 | 29.1 | 86.2 | 26.4 |
| 180 | 189.6 | 35.5 | 89.5 | 27.4 |
| 200 | 204.8 | 38.9 | 98.5 | 25.4 |
| 220 | 215.1 | 41.4 | 100.0 | 24.5 |
| 240 | 224.6 | 44.4 | 102.4 | 24.3 |
| 260 | 234.9 | 45.8 | 104.9 | 23.6 |
| 280 | 246.2 | 45.7 | 105.3 | 24.2 |
| 300 | 251.0 | 47.8 | 108.0 | 22.8 |
| 320 | 256.0 | 47.2 | 107.6 | 21.5 |
| 340 | 256.0 | 46.2 | 110.3 | 22.4 |
| 360 | 269.5 | 44.4 | 111.3 | 21.0 |
| 380 | 275.3 | 43.8 | 113.3 | 20.7 |
| 400 | 281.3 | 43.5 | 114.8 | 19.4 |

As compared to providing the touch panel with four-point support at the four corners as in FIG. 5(a), it is clear from the above experiment results that providing the touch panel with six-point support as in FIG. 5(b) decreases the energy loss during flexure vibration of the touch panel due to the piezoelectric elements and yields a higher vibration amplitude. Accordingly, the touch panel can be caused to undergo flexure vibration efficiently at a desired amplitude.

Note that the present invention is not limited to the above embodiment, and a variety of modifications and changes are possible. For example, in the above embodiment, the support members 13e and 13f supporting the middle of the long sides of the touch panel 11 may have a larger elastic coefficient than the support members 13a-13d disposed at the four corner portions 11a-11d of the touch panel 11. That is, the support members 13e and 13f may be made to easily undergo elastic deformation. In this case, as compared to the support members 13a-13d provided at the four corner portions 11a-11d, the support members 13e and 13f may be made from the same material yet have a smaller cross-sectional area, or the support members 13e and 13f may have the same cross-sectional area yet be made from a different material. This modification allows for an increase in the vibration amplitude of the touch panel 11 due to the piezoelectric elements 12. In addition, instead of being multiple, the number of piezoelectric elements 12 may be one.

Furthermore, it suffices for the bending direction of the touch panel 11 due to a press to have a component of bending at least in the short side direction. Therefore, the support members 13e and 13f at the middle of the long sides may be shorter than the support members 13a-13d at the corner portions 11a-11d, with only one end fixed to either the fixing portion 14 or the touch panel 11, and the other end contacting with the touch panel 11 or the fixing portion 14 during a press, so that the touch panel 11 acquires a component of bending in the short side direction by being pressed.

Figure 7:
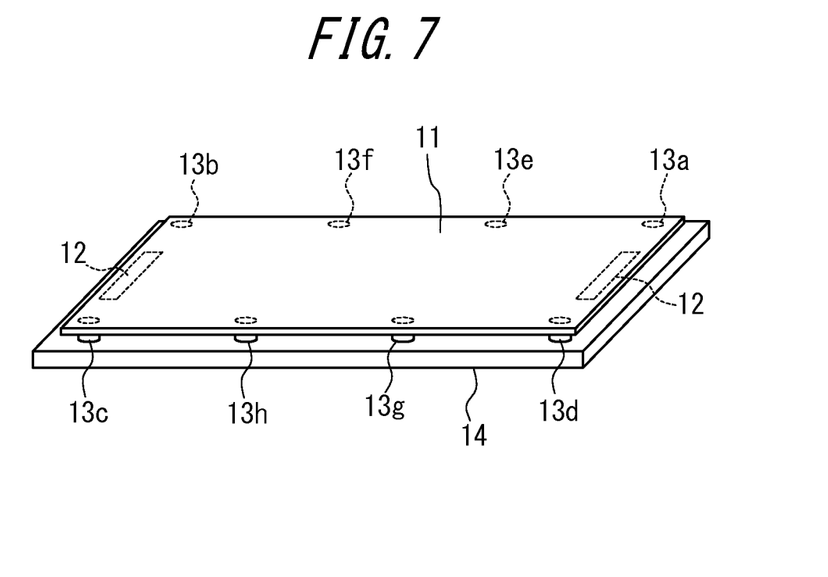
FIG. 7 is a schematic perspective view of a modification to the touch panel apparatus according to the present invention.

In the above embodiment, the oblong touch panel 11 is provided with six-point support, but depending on the size of the touch panel 11, additional support members may be provided in the long side direction, so that the touch panel 11 is provided with eight-point support by support members 13a-13h, as illustrated in FIG. 7, or with ten-point support. The touch panel 11 may thus be provided with support at six or more points so that the distance between support points adjacent in the expansion and contraction direction of the piezoelectric elements provided on the short sides of the oblong touch panel 11 is equal to or greater than the distance between support points adjacent in the direction orthogonal to the expansion and contraction direction of the piezoelectric elements.

Furthermore, the present invention is not limited to an oblong touch panel, but rather may be effectively adopted when using a touch panel of any shape. Regardless of the shape of the touch panel, it suffices to dispose support members supporting the touch panel in greater number in the direction orthogonal to the expansion and contraction direction of the piezoelectric elements than in the expansion and contraction direction, so that the bending direction of the touch panel due to a press matches the flexure direction of the touch panel due to the expansion and contraction of the piezoelectric elements.

REFERENCE SIGNS LIST

11: Touch panel
11a-11d: Corner portion
12: Piezoelectric element
13a-13h: Support member
14: Fixing portion
T: Effective operating area

The invention claimed is:

1. A touch panel apparatus comprising:
   a touch panel;
   a piezoelectric element disposed on the touch panel and capable of expansion and contraction; and
   a plurality of support members disposed on a fixing portion and configured to support and allow for flexure vibration of the touch panel, wherein
   the support members are disposed in greater number in a direction intersecting an expansion and contraction direction of the piezoelectric element than in the expansion and contraction direction so that a bending direction of the touch panel due to a press matches a flexure direction of the touch panel due to the expansion and contraction of the piezoelectric element, and
   among at least the support members disposed in the direction intersecting the expansion and contraction direction, each support member disposed between outermost support members has a larger elastic coefficient than the outermost support members.

2. The touch panel apparatus of claim 1, wherein the support members are disposed so that a distance between the support members adjacent in the direction intersecting the expansion and contraction direction of the piezoelectric element is shorter than a distance between the support members in the expansion and contraction direction of the piezoelectric element.

3. A touch panel apparatus comprising:

an oblong touch panel;

a piezoelectric element disposed along a short side of the touch panel and capable of expansion and contraction in a short side direction; and a plurality of support members disposed on a fixing portion and configured to support and allow for flexure vibration of the touch panel, wherein the support members are disposed at four corner portions of the touch panel and between the corner portions on long sides of the touch panel so that a bending direction of the touch panel due to a press matches a flexure direction of the touch panel due to the expansion and contraction of the piezoelectric element, and among at least the support members disposed in the direction parallel to the long sides of the touch panel, each support member not disposed at the corner portions has a larger elastic coefficient than the support members disposed at the corner portions.

4. The touch panel apparatus of claim 3, wherein the support members are disposed so that a distance between the support members adjacent in a direction parallel to the long sides of the touch panel is shorter than a distance between the support members in a direction parallel to short sides of the touch panel.

5. The touch panel apparatus of claim 3, wherein the touch panel includes a rectangular effective operating area having two sides parallel to the long sides of the touch panel and two sides parallel to the short sides of the touch panel; and the four corner portions are regions bordered by the long sides and the short sides of the touch panel and by extensions of the sides of the effective operating area.

* * * * *